United States Patent
Wu et al.

(10) Patent No.: US 11,880,484 B2
(45) Date of Patent: Jan. 23, 2024

(54) ENFORCING DATA ISOLATION IN JOBS EXECUTED BY A MULTI-TENANT SYSTEM ON A SECONDARY PLATFORM

(71) Applicant: Salesforce, Inc., San Francisco, CA (US)

(72) Inventors: Christopher James Wu, Fremont, CA (US); Shaun Senecal, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 908 days.

(21) Appl. No.: 16/681,775

(22) Filed: Nov. 12, 2019

(65) Prior Publication Data

US 2021/0141923 A1    May 13, 2021

(51) Int. Cl.
*G06F 21/60*      (2013.01)
*G06F 21/62*      (2013.01)
*G06F 9/455*      (2018.01)

(52) U.S. Cl.
CPC ...... *G06F 21/6236* (2013.01); *G06F 9/45558* (2013.01); *G06F 21/604* (2013.01); *G06F 2009/45587* (2013.01); *G06F 2221/2141* (2013.01)

(58) Field of Classification Search
CPC ............ G06F 21/6236; G06F 9/45558; G06F 21/604; G06F 2009/45587; G06F 2221/2141
See application file for complete search history.

(56) References Cited

U.S. PATENT DOCUMENTS

| | | | | |
|---|---|---|---|---|
| 9,646,019 | B2 * | 5/2017 | Factor | G06F 16/182 |
| 10,250,584 | B2 * | 4/2019 | Mikheev | H04W 4/60 |
| 10,609,077 | B1 * | 3/2020 | Mehr | H04L 63/08 |
| 10,630,840 | B1 * | 4/2020 | Karp | H04M 3/5235 |
| 11,169,748 | B2 * | 11/2021 | Hirata | G06N 20/10 |
| 2004/0054916 | A1 * | 3/2004 | Foster | H04L 63/083 726/5 |
| 2010/0125612 | A1 * | 5/2010 | Amradkar | H04L 63/105 707/E17.014 |

(Continued)

OTHER PUBLICATIONS

Amazon Web Services, Inc., "AWS Security Token Service: Welcome," Date Unknown, two pages, [Online] [Retrieved on Jan. 17, 2020] Retrieved from the Internet <URL: https://docs.aws.amazon.com/STS/latest/APIReference/Welcome.html>.

(Continued)

*Primary Examiner* — Lynn D Feild
*Assistant Examiner* — Abdullah Almamun
(74) *Attorney, Agent, or Firm* — Kwan & Olynick LLP (57) ABSTRACT

A multi-tenant system sends jobs for execution on a secondary platform such as a cloud based platform. The multi-tenant system sends tenant data for multiple tenants to the secondary platform. The multi-tenant system obtains job-level credentials from the secondary platform, for example, security tokens that provide access to tenant data for a fixed length of time. The multi-tenant system uses the job-level credentials for enforcing tenant level data isolation for jobs (Continued)

executed on the secondary platform. This ensures that the jobs executing on the secondary platform do not access, modify, or delete data of tenants not related to the job.

20 Claims, 5 Drawing Sheets

(56) References Cited

U.S. PATENT DOCUMENTS

| | | | | |
|---|---|---|---|---|
| 2012/0179646 | A1* | 7/2012 | Hinton | G06F 16/25 |
| | | | | 707/607 |
| 2015/0156281 | A1* | 6/2015 | Krieger | H04L 63/0428 |
| | | | | 709/203 |
| 2016/0294803 | A1* | 10/2016 | Reddy | H04L 67/289 |
| 2018/0034858 | A1* | 2/2018 | Gummaraju | H04L 63/08 |
| 2018/0077138 | A1* | 3/2018 | Bansal | G06Q 20/325 |
| 2018/0083898 | A1* | 3/2018 | Pham | H04W 4/14 |
| 2018/0083901 | A1* | 3/2018 | McGregor, Jr. | H04L 51/10 |
| 2018/0300557 | A1* | 10/2018 | Rodenas | G08B 13/19613 |
| 2018/0302391 | A1* | 10/2018 | Jones | G06F 16/284 |
| 2019/0199750 | A1* | 6/2019 | Chen | H04L 41/22 |
| 2020/0007554 | A1* | 1/2020 | Vincent | G06F 21/31 |
| 2020/0092237 | A1* | 3/2020 | Sharifi | H04N 21/4394 |
| 2020/0160190 | A1* | 5/2020 | Swamy | G06N 5/022 |
| 2020/0371509 | A1* | 11/2020 | Mark | B29C 64/386 |
| 2021/0037008 | A1* | 2/2021 | Swaminath | H04L 9/3247 |
| 2021/0136083 | A1* | 5/2021 | Gordon | H04L 63/104 |
| 2022/0248225 | A1* | 8/2022 | Bykampadi | H04L 63/10 |
| 2023/0035189 | A1* | 2/2023 | Mullin | H04L 63/105 |

OTHER PUBLICATIONS

Amazon Web Services, Inc., "AWS Services That Work with IAM," Date Unknown, 15 pages, [Online] [Retrieved on Jan. 17, 2020] Retrieved from the Internet <URL: https://docs.aws.amazon.com/IAM/latest/UserGuide/reference_aws-services-that-work-with-iam.html>.

Heroku Dev Center, "Einstein Platform Services," Apr. 10, 2018, 12 pages, [Online] [Retrieved on Jan. 17, 2020] Retrieved from the Internet <URL: https://devcenter.heroku.com/articles/einstein-platform-services>.

Intellipaat, "What is Salesforce Einstein?," Jul. 18, 2019, 13 pages, [Online] [Retrieved on Jan. 17, 2020] Retrieved from the Internet <URL: https://intellipaat.com/blog/what-is-salesforce-einstein/>.

Salesforce.com, Inc., "Einstein Platform: Developer Center," Date Unknown, 5 pages, [Online] [Retrieved on Jan. 17, 2020] Retrieved from the Internet <URL: https://developer.salesforce.com/developer-centers/ein-platform/>.

Socher, R., "Introducing New Einstein Platform Services for Building AI-Powered CRM Apps," Jun. 28, 2017, 3 pages, [Online] [Retrieved on Jan. 17, 2020] Retrieved from the Internet <URL: https://www.salesforce.com/blog/2017/06/introducing-einstein-platform-services.html>.

* cited by examiner

ENFORCING DATA ISOLATION IN JOBS EXECUTED BY A MULTI-TENANT SYSTEM ON A SECONDARY PLATFORM

BACKGROUND

Field of Art

This disclosure relates in general to multi-tenant systems, and in particular to enforcing data isolation in jobs executed by a multi-tenant system in a secondary platform that does not provide tenant-level data isolation.

Description of the Related Art

A multi-tenant system stores data for multiple tenants and allows tenants to run applications and jobs. The multi-tenant system enforces tenant-level data isolation. Accordingly, the multi-tenant system ensures that jobs of one tenant do not access data of another tenant unless the data is explicitly shared. Certain jobs require large amount of resources. For example, training of machine learning models such as neural networks requires large amount of computational resources. A multi-tenant system may execute such jobs on a secondary platform, for example, cloud based services such as AWS (AMAZON WEB SERVICES), GOOGLE cloud platform, MICROSOFT AZURE, and so on.

However, these secondary platforms may not enforce tenant level data isolation. As a result, a job of one tenant running on the secondary platform may access data of another tenant stored on the secondary platform. Such data access may be caused accidentally due to errors in the instructions of the job or may be caused by a malicious user. Such cross-tenant data access may cause corruption of data, loss of sensitive information, or may cause deletion of tenant data that is unrelated to the job being executed. Conventional techniques fail to enforce tenant level data isolation required by the multi-tenant system for jobs executed on secondary platforms.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A multi-tenant system sends jobs for execution on a secondary platform such as a cloud based platform. A job may also be referred to herein as a task or a process. The cloud based platform may provide compute clusters for running computation intensive jobs such as training of machine learning based models such as neural networks. The multi-tenant system sends tenant data for multiple tenants to the secondary platform for storing and processing.

The multi-tenant system provides tenant-level data isolation that is not provided by the secondary platform. Embodiments use job-level credentials to enforce tenant level data isolation for jobs executed on the secondary platform. This ensures that the jobs executing on the secondary platform do not access, modify, or delete data of tenants not related to the job.

In an embodiment, the multi-tenant system receiving a job request for one of the tenants and executes the requested job on the secondary platform as follows. The multi-tenant system identifies tenant data on the secondary platform that is relevant for the job. The multi-tenant system verifies that the tenant requesting the job has access to the identified tenant data. The multi-tenant system receives a job-level credential from the secondary platform that permits access to the relevant tenant data. For example, the job-level credential may be a security token provided by the secondary platform that provides access to portions of the tenant data for a predetermined length of time. The multi-tenant system sends a request to the secondary platform to execute the job. The job gains access to the relevant tenant data through use of the job-level credential.

In an embodiment, the multi-tenant system receives a job configuration for the job request. The job configuration identifies storage locations associated with the requested job, for example, storage location of the executable file storing executable instructions for the requested job, storage location for storing temporary data processed by the job, and storage location for output results. The multi-tenant system sends a request to the secondary platform to provide job-level credential to permit access to the one or more storage locations. The multi-tenant system receives the job-level credential from the secondary platform. The multi-tenant system annotates the job configuration with the job-level credential and sends the annotated job configuration to the secondary platform.

Overall System Environment

Figure 1:
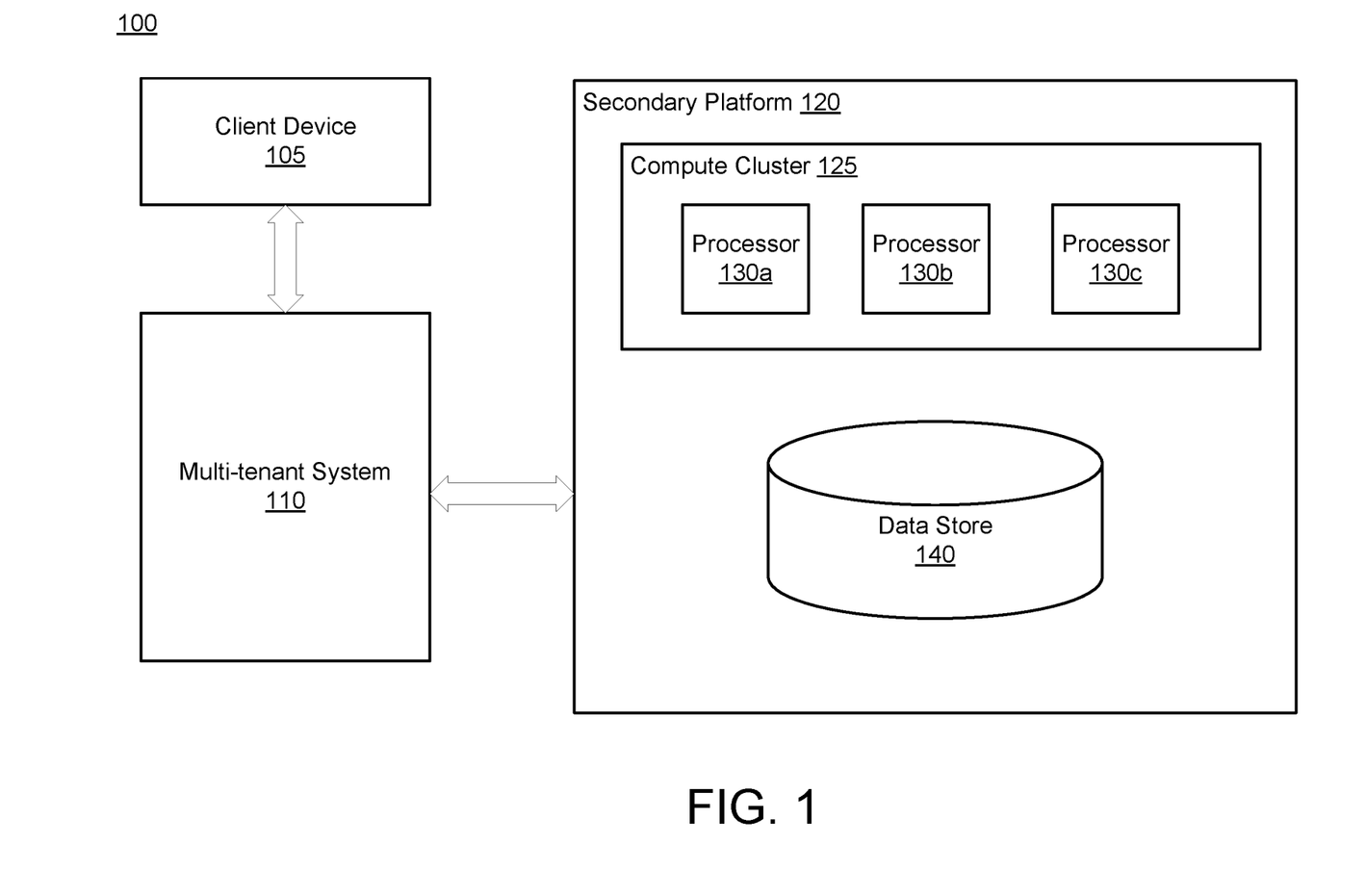
FIG. 1 is a block diagram of a system environment illustrating a multi-tenant system enforcing data isolation on a process executing in a secondary platform according to one embodiment.

FIG. 1 is a block diagram of a system environment 100 illustrating a multi-tenant system enforcing data isolation on a process executing in a secondary platform according to one embodiment. The system environment 100 comprises a multi-tenant system 110, a secondary platform 120, and one or more client devices 105. In other embodiments, the system environment 100 may include other more or fewer components, for example, there may be multiple client devices 105.

The multi-tenant system 110 stores information of one or more tenants. Each tenant may be an enterprise as described herein. Each tenant may represent a customer of the multi-tenant system 110. Each tenant may have multiple users that interact with the multi-tenant system via client devices 105. As an example, one tenant might be a company that employs a sales force where each salesperson uses a client device 105 to manage their sales process. Thus, a user might maintain contact data, leads data, customer follow-up data, performance data, goals and progress data, etc., all applicable to that user's personal sales process.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

In some embodiments, the multi-tenant system 110 allows tenants to run jobs that take significant amount of resources, for example, a cluster of processors. The multi-tenant system may use a secondary platform 120 for running such jobs. An example of a secondary platform 120 a cloud based system, for example AWS (AMAZON web services), GOOGLE cloud platform, or MICROSOFT AZURE. The secondary platform 120 includes various resources, for example, multiple processors 130 and multiple data stores 140. The multi-tenant system 110 can request a compute cluster 125 comprising a plurality of processors 130 as well as storage space available on one or more data stores 140. The multi-tenant system 110 may periodically transfer tenant data from one or more tenants to the secondary platform 120 for storing in data store 140. Examples of jobs that may be executed on a secondary platform include training of machine learning models such as neural networks. The tenant data may be used as training data for training the machine learning models used by the tenants.

The multi-tenant system 110 receives a request from users of a tenant to perform a job. The multi-tenant system 110 may use all of the compute cluster 125 or a subset of the compute cluster 125 for executing the job. The multi-tenant system 110 provides the result of the execution of the job to the user. For example, if the job performs training of a machine learning based model, the multi-tenant system 110 provides the trained machine learning based model as the result of the execution.

A tenant may periodically upload tenant data to the secondary platform 120 and periodically retrain the model. For example, the tenant data may represent user interactions and the machine learning based model may output scores representing predictions based on the user interactions, for example, a score indicating a likelihood that a user would perform an action. The tenant may periodically upload the user interaction data to the secondary platform 120 and retrain the machine learning model every month to capture changes in user interaction patterns that occur over time. Other types of machine learning based models trained using the secondary platform include neural networks used for ranking search results.

The multi-tenant system 110 may provide APIs (application programming interface) to users of a tenant to upload data to the secondary platform and perform jobs using the uploaded data. Multiple tenants may invoke the APIs and upload data to the secondary platform 120 and execute jobs on the secondary platform. Accordingly, the secondary platform 120 may store tenant data for multiple tenants and execute jobs for multiple tenants. The secondary platform 120 may execute multiple jobs for different tenants concurrently. For example, the compute cluster may be shared to run jobs of different tenants.

The multi-tenant system 110 implements security protocols that keep data separate for different tenants and ensure that processes executed by one tenant do not access data of another tenant. For example, the same database table may store rows of different tenants. However, the multi-tenant system 110 stores information with each row to identify the tenant associated with that row. Furthermore, the multi-tenant system 110 uses queries that filter rows of a specific tenant when processing data of the database table. If data is stored in other formats such as files, the multi-tenant system 110 implements permissions to ensure that files of one tenant cannot be accessed by any other tenant.

However, the secondary platform 120 may not implement such security protocols that support tenant-level data isolation. Even if the secondary platform implements certain security protocols, these security protocols may match the security protocols of the multi-tenant systems. For example, the secondary platform may not store all the metadata necessary to associate each tenant data with the corresponding tenant.

Furthermore, jobs requested by tenants do not represent trusted code. Trusted code of the multi-tenant system represents code that is developed by developers associated with the multi-tenant system and tested to ensure that it conforms to all security protocols of the multi-tenant system. In contrast, jobs requested by tenants are not tested by developers/testers of the multi-tenant system and are not expected to conform to security protocols of the multi-tenant system. As a result, jobs of a tenant that execute on the secondary platform may access data of other tenants. Such cross-tenant data access in the secondary platform may be accidental, for example, as a result of programming errors in the instructions of the jobs. Alternatively, the cross-tenant data access may be caused by malicious programming, for example, a user of a tenant executing a program to purposely access data of another tenant.

A secondary platform 120 typically provides basic security primitives for controlling data access. For example, the secondary platform 120 may provide job-level credentials that allow a job to have temporary access to a portion of the data store 140. The multi-tenant system 110 uses these basic security primitives of the secondary platform 120 to implement a security protocol in the secondary platform 120 that prevents a job of a tenant from accessing data of a different tenant.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

System Architecture

Figure 2:
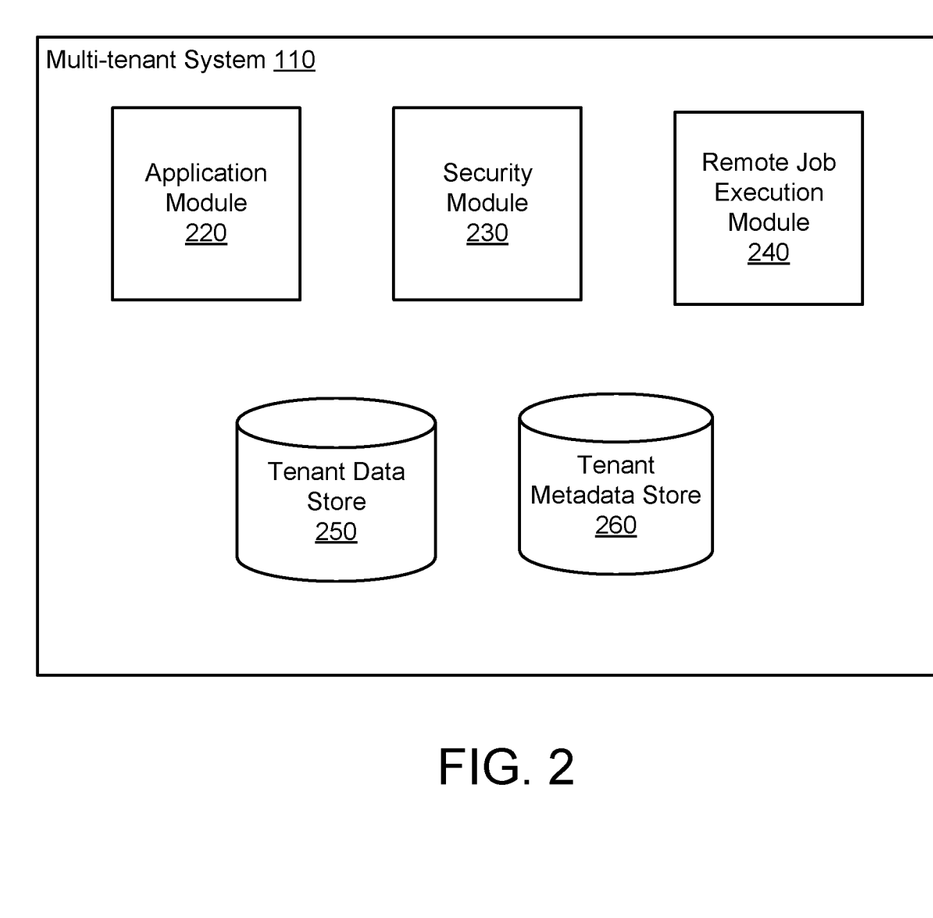
FIG. 2 is a block diagram illustrating components of a multi-tenant system according to one embodiment.

FIG. 2 is a block diagram illustrating components of a multi-tenant system according to one embodiment. The multi-tenant system 110 comprises an application module 220, a security module 230, a remote job execution module 240, a tenant data store 250, and a tenant metadata store 260. Other embodiments can have different and/or other components than the ones described here, and that the functionalities can be distributed among the components in a different manner.

The application module 220 stores instructions of different applications that the multi-tenant system 110 allows tenants to execute. In one embodiment, multi-tenant system 110 implements a web-based customer relationship management (CRM) system. For example, the application module 220 may store applications configured to implement and execute CRM software applications.

The tenant data store 250 stores data for various tenants of the multi-tenant store. The tenant data store 250 may store data for different tenants in separate physical structures, for example, separate database tables or separate databases. Alternatively, the tenant data store 250 may store data of multiple tenants in a shared structure. For example, user accounts for all tenants may share the same database table. However, the multi-tenant system 110 stores additional information to logically separate data of different tenants.

The tenant metadata store 260 stores metadata for each tenant. For example, the tenant metadata may store permissions identifying applications that a user of a tenant is permitted to execute. The tenant metadata may store information describing any customized entity types that are created by a tenant. The tenant metadata may also store information describing various jobs that the tenant execute within the multi-tenant system 110 or in the secondary platform 120. The tenant metadata stores information describing tenant data stored in the secondary platform. For example, the tenant metadata stores storage locations that store tenant data and their associations with the corresponding tenants.

The security module 230 implements tenant-level data isolation within the multi-tenant system 110. Accordingly, the security module 230 ensures that tasks of a tenant executing within the multi-tenant system 110 are not able to access data of any other tenant. Similarly, the security module 230 ensures that a user of a tenant is not able to access data of any other tenant. In an embodiment, the security module 230 maintains information that logically separates data of different tenants. For example, the security module 230 may maintain one or more columns of a database table to store tenant identifiers to allow the multi-tenant system 110 to identify the tenant for each row. In an embodiment, the security module 230 modifies data access requests from a tenant to ensure that only data of that tenant is accessed. For example, the security module 230 may modify queries to ensure that only the subset of data of the tenant is accessed by the query and data of other tenants is filtered out.

The remote job execution module 240 executes jobs remotely in the secondary platform 120. The remote job execution module 240 receives requests for remote job execution from users of tenants and sends a request to the secondary platform to execute the jobs. In an embodiment, the remote job execution module 240 builds a job configuration structure storing information necessary for executing a job in the secondary platform. The job configuration structure stores information describing the storage location of an executable files storing executable instructions of the job, the storage location for any temporary data that is generated during the execution of the job, storage location for any input data that is used by the job, and storage location for any output data generated by the job. In an embodiment, the job configuration structure is stored in a job configuration file that is transferred to the secondary platform 120 for executing the job on the secondary platform 120. The term file as referred to herein also includes directories that allow multiple files as well as other directories to be stored within.

Figure 3:
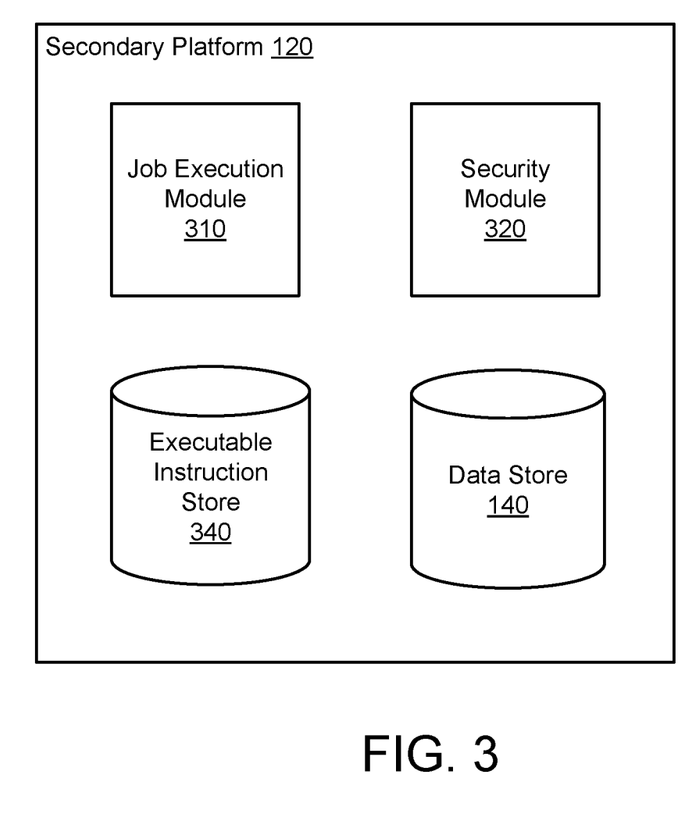
FIG. 3 is a block diagram illustrating components of a secondary platform according to one embodiment.

FIG. 3 is a block diagram illustrating components of a secondary platform according to one embodiment. The secondary platform 120 comprises a job execution module 310, a security module 320, an executable instruction store 340, and a data store 140. Other embodiments can have different and/or other components than the ones described here, and that the functionalities can be distributed among the components in a different manner.

The job execution module 310 receives requests to execute jobs from the multi-tenant system 110 and performs the jobs by executing instructions that may be stored files stored in the executable instructions store 340. Each file storing executable instructions is associated with a file path within the executable instructions store. The instructions of the jobs are executed by one or more processors 130.

A job may process data including (1) data received as input by the job, (2) temporary data generated by the job while processing the job, and (3) data output by the job and returned as the result of execution of the job. The data processed by the job may be stored in memory of the processors 130. The data processed by a job may be stored in one or more files in the data store 140. For example, the (1) the input data may be stored in an input data file, (2) temporary data may be stored in a temporary data file, and (3) output data may be stored in an output data file. Each file is identified using a file path within the data store 140.

The security module 320 generates job-level credentials to permit access to data. The multi-tenant system 110 uses job-level credentials generated by the security module 320 to limit data access by jobs executed by tenants in the secondary platform 120. For example, the security module 320 can generate a security token that grants access for a fixed length of time to one or more files of the data store 140. The security token is used by the jobs to access the files. The job is unable to access the file after the period allowed by the security token. Accordingly, even if a job gets unauthorized access to some data, for example, a file in the data store 140, the access gets automatically revoked after the period allowed by the security token.

Overall Process

Figure 4:
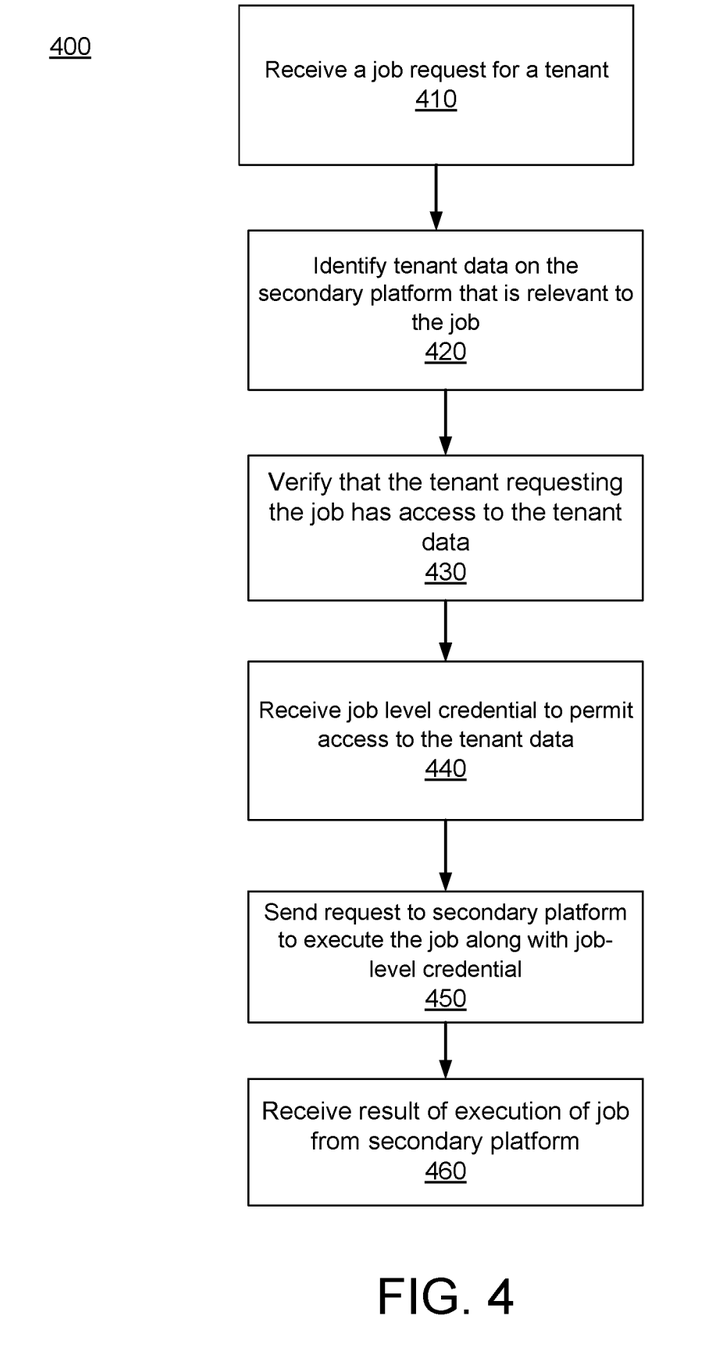
FIG. 4 is a flow chart illustrating the process for executing a job on the secondary platform according to one embodiment.

FIG. 4 is a flow chart illustrating the process for executing a job on the secondary platform according to one embodiment. Other embodiments can perform the steps of FIG. 4 in different orders. Moreover, other embodiments can include different and/or additional steps than the ones described herein.

The multi-tenant system 110 transfers tenant data to the secondary platform 120. The multi-tenant system 110 may transfer tenant data on a periodic basis. The secondary platform 120 receives and stores tenant data for multiple tenants. The secondary platform 120 may store tenant data for each tenant in one or more files. These storage locations may have been received previously by the multi-tenant system 110, for example, in response to requests sent to the secondary platform. The multi-tenant system 110 stores information describing storage locations storing tenant data for each tenant on the secondary platform 120.

The following are the steps for execution of a job for a tenant. However, these steps may be repeated for multiple jobs for a particular tenant or for jobs for multiple tenants. The secondary platform 120 may execute multiple jobs for the same or for different tenants concurrently using a compute cluster.

The multi-tenant system 110 receives 410 a job request for a tenant. In an embodiment, the multi-tenant system 110 receives a job configuration for the job. The job configuration may specify various details for executing the job including information identifying executable files storing instructions for the job, storage location for storing tenant data processed by the job for example, the input data, storage location for storing the output data, and storage location for storing any temporary data processed by the job The multi-tenant system 110 performs the following steps for executing the requested job on the secondary platform 120. The multi-tenant system 110 identifies 420 tenant data on the secondary platform that is relevant for the job. If the multi-tenant system 110 receives a job configuration for the job, the multi-tenant system 110 analyzes the job configuration to determine the tenant data. For example, the job configuration may include the address of one or more files on the secondary platform 120 storing the tenant data.

The multi-tenant system 110 verifies 430 that the tenant requesting the job has access to the identified tenant data. In an embodiment, the multi-tenant system 110 compares the information received in the job configuration with the information stored in the tenant metadata store 260 identifying the storage locations of the secondary platform 120 where tenant data is stored.

The multi-tenant system 110 receives 440 a job-level credential that permits access to the relevant tenant data. For example, the multi-tenant system 110 may receive a security token that expires after a predefined amount of time that allows access to tenant data for the predefined time. In an embodiment, the multi-tenant system 110 identifies all storage locations associated with the job, for example, the location of the files storing executable instructions, locations of files storing input data, location of files where output data or temporary data may be stored. The multi-tenant system 110 sends a request to the secondary platform to provide a job-level credential, for example, a security token valid for a specified amount of time that allows access to the identified storage locations. The multi-tenant system 110 receives the job-level credential from the secondary platform 120.

The multi-tenant system 110 sends 450, a request to the secondary platform to execute the job. The multi-tenant system 110 provides the job-level credential along with the request. The secondary platform executes the requested job and uses the job-level credential to provide access to the relevant tenant data to the job.

The multi-tenant system 110 receives 460 the result of execution of the job from the secondary platform. For example, if the job request was for training a machine learning model, the multi-tenant system 110 receives a trained machine learning model from the secondary platform 120. The multi-tenant system 110 provides the result of execution of the job to the user of the tenant that requested execution of the job.

In an embodiment, the job execution module 310 periodically stores states of jobs so that the job can be restarted if the process executing the job crashes for any reason. In an embodiment, the instructions for a job automatically save the state of the job periodically. The job execution module 310 manages execution of long running jobs that take longer than the time allowed by the security token.

For example, assume that the multi-tenant system 110 obtains a security token that is valid for a given time and provides to the job execution module 310 for executing a job. Also assume that the job takes longer than the time allowed by the security token. The secondary platform 120 periodically saves the state of the job. The job stops execution after time T since the security token expires. The job execution module 310 sends a signal to the multi-tenant system 110 indicating that the job did not complete in the time allotted by the security token. The multi-tenant system 110 requests a new job-level credential and provides the new job-level credential to the job execution module 310. The job execution module 310 restarts the job from the last saved state of the job using the new job-level credential. This process is repeated until the job completes execution.

In some embodiments, the multi-tenant system 110 determines the length of the time for which the job-level credential is valid based on an estimate of the time that the job is expected to take. The multi-tenant system 110 may receive an estimate of the time that the job is likely to take from a user, for example, a system administrator. In some embodiments, the multi-tenant system 110 uses historical data to determine the estimate of the time that the job is likely to take. For example, the multi-tenant system 110 stores historical data describing statistical aggregates of time taken by training jobs for different types of machine learning training jobs. The multi-tenant system 110 compares with the historical estimates to get an estimate of how long a new job may take. The multi-tenant system 110 may consider other factors for example the size of training data to determine the estimates of length of time taken by a job.

Computer Architecture

Figure 5:
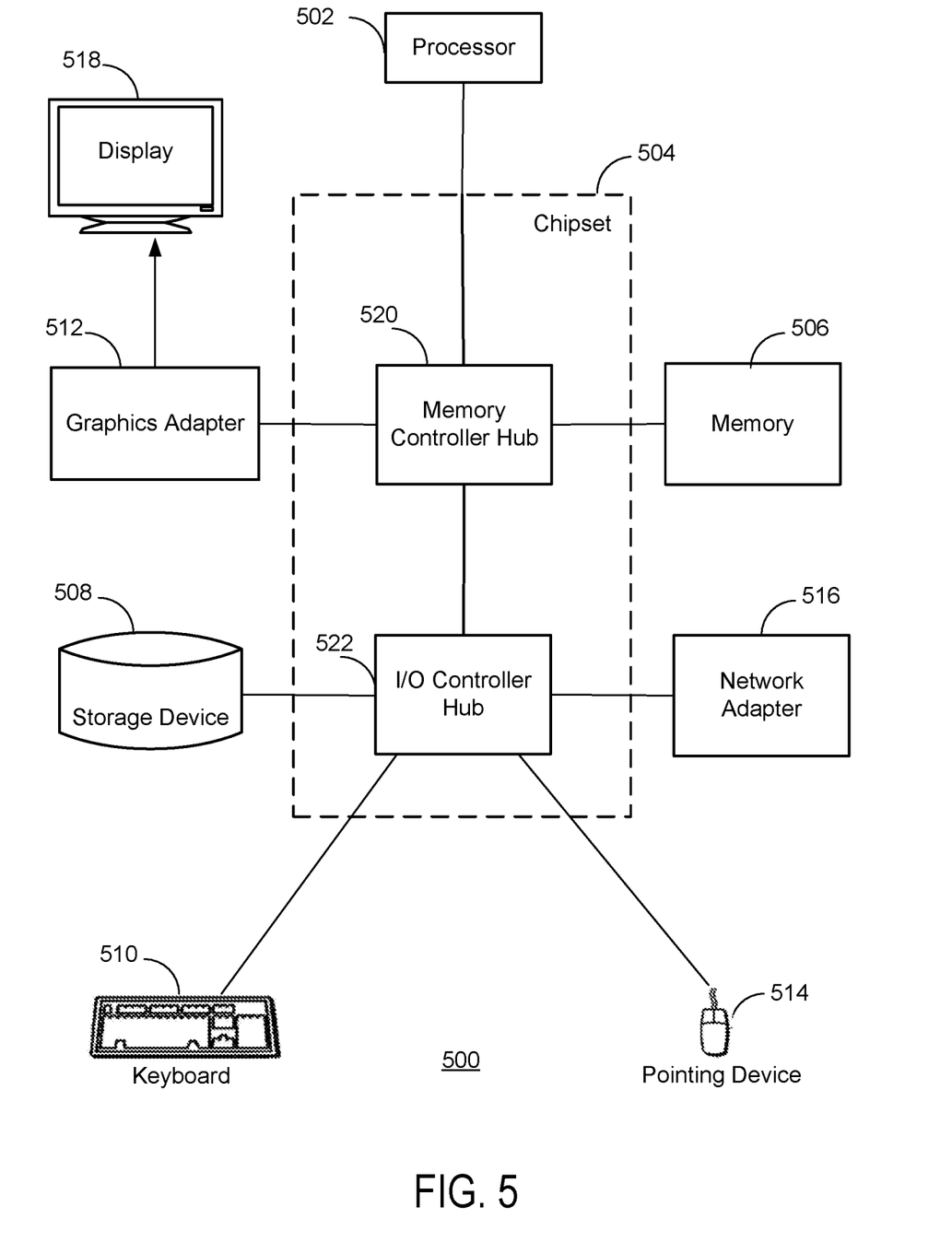
FIG. 5 is a block diagram illustrating a functional view of a typical computer system for use in the environment of FIG. 1 according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 200. The graphics adapter 512 displays images and other information on the display 518. The network adapter 516 couples the computer system 500 to a network.

As is known in the art, a computer 500 can have different and/or other components than those shown in FIG. 5. In addition, the computer 500 can lack certain illustrated components. For example, a computer system 500 acting as a multi-tenant system 110 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 104 may be a mobile phone with limited processing power, a small display 518, and may lack a pointing device 514. The multi-tenant system 110 and the secondary platform 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for maintaining tenant-level data isolation in a system comprising a multi-tenant platform and a secondary platform, wherein the multi-tenant platform hosts tenant data of multiple tenants, the secondary platform is a cloud-based platform having a compute cluster configured to execute jobs, and the secondary platform does not provide tenant-level data isolation, the method comprising:
   transferring tenant data of multiple tenants from the multi-tenant platform to the secondary platform;
   receiving, by the multi-tenant platform, a job request from a client device of one of the multiple tenants;
   executing the requested job on the secondary platform, comprising:
     identifying, by the multi-tenant platform, a portion of tenant data stored on the secondary platform that is relevant for the job;
     verifying, by the multi-tenant platform, that the tenant requesting the job has access to the identified portion of tenant data, causing the secondary platform to generate a job-level credential that permits access to the relevant portion of tenant data for a purpose of executing the job;
     receiving, by the multi-tenant platform, from the secondary platform, the job-level credential; and
     sending, from the multi-tenant platform to the secondary platform, a request to execute the job, causing the computer cluster of the secondary platform to access the relevant portion of tenant data using the job-level credential.

2. The computer implemented method of claim 1, wherein executing the requested job on the secondary platform, comprises:
- requesting resources from the secondary platform to execute the job; and
- requesting that the secondary platform execute the job, wherein the resources on the secondary platform obtain access to the relevant tenant data through use of the job-level credential.

3. The computer implemented method of claim 1, wherein the secondary platform is a cloud computing system.

4. The method of claim 1, wherein the job-level credential is a security token provided by the secondary platform, wherein the security token provides access to at least a portion of tenant data for a predefined length of time.

5. The method of claim 1, further comprising:
- receiving a job configuration for the job request, the job configuration identifying one or more storage locations associated with the requested job;
- sending a request to the secondary platform to provide job-level credential to permit access to the one or more storage locations;
- receiving the job-level credential from the secondary platform wherein the job-level credential provides access to the one or more storage locations for a predetermined amount of time;
- annotating the job configuration with the job-level credential; and
- sending the annotated job configuration to the secondary platform.

6. The method of claim 5, wherein the one or more storage locations comprise one or more of:
- a storage location of an executable file storing executable instructions for the requested job;
- a storage location for storing temporary data processed by the job during execution; and
- a storage location for storing output results of execution of the job.

7. The method of claim 1, wherein the job-level credential provides access to tenant data for a predetermined length of time, the method further comprising:
- periodically saving a state of the job in a persistent storage by the secondary platform;
- responsive to the job failing to complete within the predetermined length of time, receiving a new job-level credential that provides access to tenant data for another predetermined length of time; and
- restarting the job from a last state of the job that was saved by the secondary platform.

8. The computer implemented method of claim 1, wherein the job comprises training of a machine learning model using the tenant data.

9. A non-transitory computer readable storage medium for storing instructions that when executed by a computer processor cause the computer processor to perform steps for maintaining tenant-level data isolation in a system comprising a multi-tenant platform and a secondary platform, wherein the multi-tenant platform hosts multiple tenants, the secondary platform is a cloud-based platform having a computer cluster configured to execute jobs, and the secondary platform does not provide tenant-level data isolation, the steps comprising:
- transferring tenant data of multiple tenants from the multi-tenant platform to the secondary platform;
- receiving, by the multi-tenant platform, a job request from a client of one of the multiple tenants;
- executing the requested job on the secondary platform, comprising:
  - identifying, by the multi-tenant platform, a portion of tenant data stored on the secondary platform that is relevant for the job;
  - verifying, by the multi-tenant platform, that the tenant requesting the job has access to the identified portion of tenant data, causing the secondary platform to generate a job-level credential that permits access to the relevant portion of tenant data for a purpose of executing the job;
  - receiving, by the multi-tenant platform, from the secondary platform, the job-level credential; and
  - sending, from the multi-tenant platform to the secondary platform, a request to execute the job, causing the computer cluster of the secondary platform to access the relevant portion of tenant data using the job-level credential.

10. The non-transitory computer readable storage medium of claim 9, wherein executing the requested job on the secondary platform, comprises:
- requesting resources from the secondary platform to execute the job; and
- requesting that the secondary platform execute the job, wherein the resources on the secondary platform obtain access to the relevant tenant data through use of the job-level credential.

11. The non-transitory computer readable storage medium of claim 9, wherein the job-level credential is a security token provided by the secondary platform, wherein the security token provides access to at least a portion of tenant data for a predefined length of time.

12. The non-transitory computer readable storage medium of claim 9, wherein the stored instructions further cause the computer processor to perform steps comprising:
- receiving a job configuration for the job request, the job configuration identifying one or more storage locations associated with the requested job;
- sending a request to the secondary platform to provide job-level credential to permit access to the one or more storage locations;
- receiving the job-level credential from the secondary platform wherein the job-level credential provides access to the one or more storage locations for a predetermined amount of time;
- annotating the job configuration with the job-level credential; and
- sending the annotated job configuration to the secondary platform.

13. The non-transitory computer readable storage medium of claim 12, wherein the one or more storage locations comprise one or more of:
- a storage location of an executable file storing executable instructions for the requested job;
- a storage location for storing temporary data processed by the job during execution; and
- a storage location for storing output results of execution of the job.

14. The non-transitory computer readable storage medium of claim 9, wherein the job-level credential provides access to tenant data for a predetermined length of time, wherein the stored instructions further cause the computer processor to perform steps comprising:
- periodically saving a state of the job in a persistent storage by the secondary platform;
- responsive to the job failing to complete within the predetermined length of time, receiving a new job-level credential that provides access to tenant data for another predetermined length of time; and restarting the job from a last state of the job that was saved by the secondary platform.

15. A computer system comprising:
a computer processor; and
a non-transitory computer readable storage medium for storing instructions that when executed by the computer processor, cause the computer processor to perform steps for maintaining tenant-level data isolation in a system comprising a multi-tenant platform and a secondary platform, wherein the multi-tenant platform hosts multiple tenants, the secondary platform is a cloud-based platform having a compute cluster configured to execute jobs, and the secondary platform does not provide tenant-level data isolation, the steps comprising:
transferring tenant data of multiple tenants from the multi-tenant platform to the secondary platform;
receiving, by the multi-tenant platform, a job request from a client of one of the multiple tenants;
executing the requested job on the secondary platform, comprising:
identifying, by the multi-tenant platform, a portion of tenant data stored on the secondary platform that is relevant for the job;
verifying, by the multi-tenant platform, that the tenant requesting the job has access to the identified portion of tenant data, causing the secondary platform to generate a job-level credential that permits access to the portion of tenant data for a purpose of executing the job;
receiving, by the multi-tenant platform, from the secondary platform, the job-level credential; and
sending, from the multi-tenant platform to the secondary platform, a request to execute the job, causing the compute cluster of the secondary platform to access the-the relevant portion of tenant data using the job-level credential.

16. The computer system of claim 15, wherein the job-level credential is a security token provided by the secondary platform, wherein the security token provides access to at least a portion of tenant data for a predefined length of time.

17. The computer system of claim 15, wherein the instructions for executing the requested job on the secondary platform, comprise instructions for:
requesting resources from the secondary platform to execute the job; and
requesting that the secondary platform execute the job, wherein the resources on the secondary platform obtain access to the relevant tenant data through use of the job-level credential.

18. The computer system of claim 15, wherein the instructions further cause the computer processor to perform steps comprising:
receiving a job configuration for the job request, the job configuration identifying one or more storage locations associated with the requested job;
sending a request to the secondary platform to provide job-level credential to permit access to the one or more storage locations;
receiving the job-level credential from the secondary platform wherein the job-level credential provides access to the one or more storage locations for a predetermined amount of time;
annotating the job configuration with the job-level credential; and
sending the annotated job configuration to the secondary platform.

19. The computer system of claim 18, wherein the one or more storage locations comprise one or more of:
a storage location of an executable file storing executable instructions for the requested job;
a storage location for storing temporary data processed by the job during execution; and
a storage location for storing output results of execution of the job.

20. The computer system of claim 15, wherein the job-level credential provides access to tenant data for a predetermined length of time, wherein the instructions further cause the computer processor to perform steps comprising:
periodically saving a state of the job in a persistent storage by the secondary platform;
responsive to the job failing to complete within the predetermined length of time, receiving a new job-level credential that provides access to tenant data for another predetermined length of time; and
restarting the job from a last state of the job that was saved by the secondary platform.

* * * * *